Sept. 20, 1949. J. FRIED 2,482,472
BICYCLE AND FRAME AND PARTS THEREFOR
Filed Feb. 7, 1946 2 Sheets-Sheet 1

INVENTOR.
Jack Fried
BY C. P. Goepel
his ATTORNEY

Sept. 20, 1949.  J. FRIED  2,482,472
BICYCLE AND FRAME AND PARTS THEREFOR
Filed Feb. 7, 1946  2 Sheets-Sheet 2
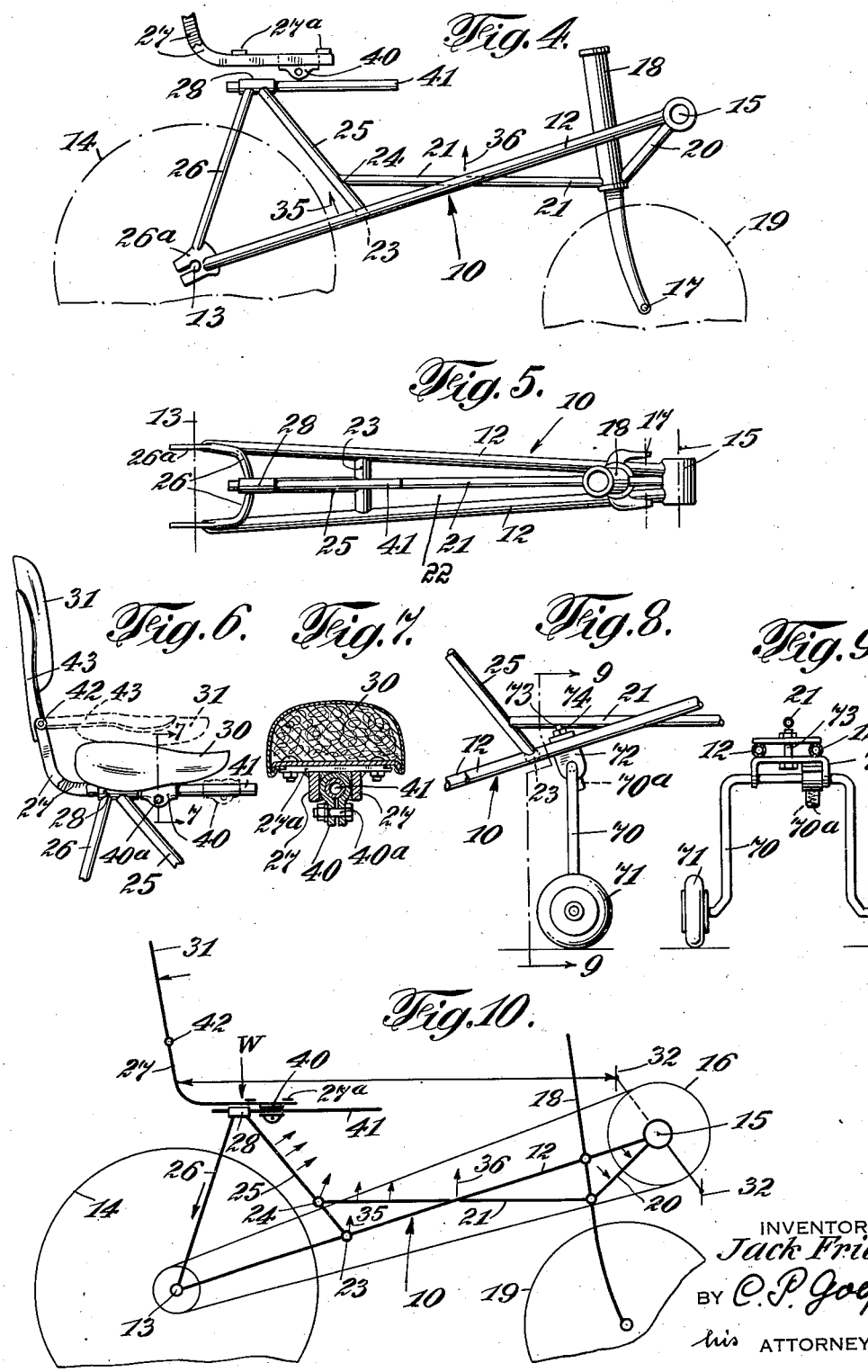

Patented Sept. 20, 1949

2,482,472

UNITED STATES PATENT OFFICE 2,482,472

BICYCLE AND FRAME AND PARTS THEREFOR

Jack Fried, New York, N. Y.

Application February 7, 1946, Serial No. 646,143

3 Claims. (Cl. 280—261)

This invention relates generally to bicycles of the type in which the pedals are disposed in advance of the seat, in contrast to the older form where the pedals are disposed almost below the seat to receive the downward thrust pressure of the legs.

The bicycles of the horizontal pedaling type referred to, have many disadvantages among which are the heaviness of the frames, and also the failure to translate the pressure to the best possible extent.

The object of this invention is to overcome these disadvantages and to provide an improved bicycle which is especially compact, but which so coordinates the forces applied as to assist rather than hinder the action of the bicycle considered as a whole.

For this purpose, the invention consists essentially of a bicycle frame of novel construction, which has a single longitudinal frame member, composed of two bars, joined at their front ends, and straddling the front post and the rear axle. The parts are so arranged that the seat and pedal present a full thrust position on substantially a straight horizontal line, to avail of the lumbar muscles of the rider. Force translating members are provided to prevent the forces applied to the bicycle by the rider from exerting downwardly acting forces, which downward forces add to the weight of the bicycle and make it unyieldable and subject to shock actions when meeting rough terrain. The translated forces are intended and do tend to lift the main frame, thus making the bicycle more resilient and of apparent less weight when in use. To carry out these concepts, the main frame is combined with bars providing front and rear force couples.

The invention includes also an improved seat and back rest. Also, an improved combination kickstand and self instructor. Also a handle adjusting mechanism.

The invention will be more fully described hereinafter, embodiments shown in the drawings, and the invention will be finally pointed out in the claims.

In the accompanying drawings,

Fig. 4 is a side view of the improved frame;

Fig. 5 is a plan view of the improved frame;

Fig. 6 is a side view of the seat and back;

Fig. 7 is a section taken on line 7—7 of Fig. 6;

Fig. 8 is a partial view of the frame, showing an attachment detachably applied thereto, to enable beginners to learn how to balance;

Fig. 9 is a section taken on line 9—9 of Fig. 8, and

Fig. 10 is a diagrammatic side view of the frame, showing the action of the forces, of certain couples of forces operated by the main forces applied, to explain the operation of the improved frame.

Similar characters of reference indicate corresponding parts throughout the various views.

Figure 1:
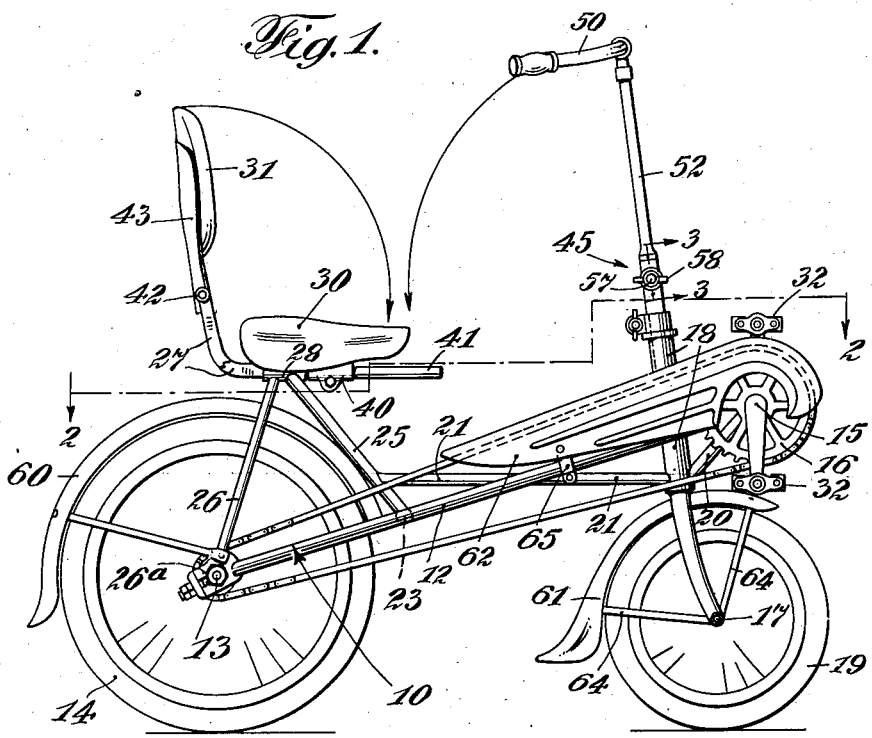
Fig. 1 is a side view of a bicycle embodying my invention.
Figure 2:
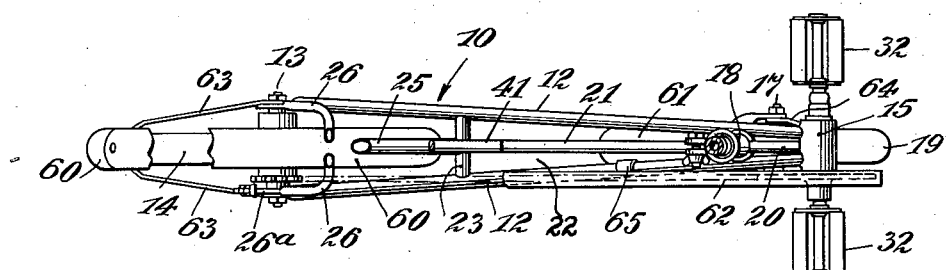
Fig. 2 is a plan sectional view taken on line 2—2 of Fig. 1.

Referring to the drawings, the novel frame generally indicated by 10, has a single frame made of main spaced members 12 which extend from the axle 13 of the rear wheel 14, to the axle 15 of the sprocket 16, the spaced members 12 being joined at their front ends at the axle 15 and extend along each side of the front post 18, and to each end of the axle 13 of the rear wheel 14. The connection of the spaced members with the front post is almost directly above the axle 17 of the front wheel 19, and the front juncture connection of the spaced members 12 is above the front wheel and does not extend beyond the perimeter of the front wheel 19. The front of the sprocket 16 and the front of the front wheel 19 are substantially tangent to a perpendicular line. The front wheel has a diameter to clear the pedals in any position of the front wheel. These main spaced members 12 thus extend from the axle 15 of the sprocket 16, to the axle 13 of the rear wheel, with the vertical front post 18 therebetween. While the diameter of the tubing and strength of the tubing is such as to give resistance to the weight and forces acting downwardly, a certain resiliency is contemplated and this to some extent arises from the fact of a single member frame unaccompanied by any parallel or vertical members intended to assume a part of its strain and stress.

In cooperation with this single frame member two couples of force are provided which have for their object to take off from said single frame member as much downward force as possible, with the intent that the weight of the bicycle and rider (downward force) be increased as little as possible.

The first couple consists of an elbow lever action, composed of a bar 20 (Fig. 4) extending from the axle 15 of the sprocket to the front post 18 and of a bar 21 extending from the front post 18 to a downwardly extending bar 25 forming part of the second couple. This bar 21 passes through the space 22 between the bars 12 of the single frame member 10.

A rear bar 26 extends at an angle to the vertical, from the rear axle 13 upwardly, and is connected at its upper end to the bar 25 by a sleeve 28. The main object of the bar 26 is to assume some of the dead weight of the rider or part thereof, which weight is taken up by the axle 13.

The second couple is composed of the angularly disposed back bar 27 and the bar 25.

The actions of the two couples are to take up the forces exerted by the muscular action of the rider and to translate them in a direction opposite to a downward direction, since a downward direction would add to the dead weight.

It is noted that the seat 30 of the rider and the pedals 32 when in their upward position to receive their greatest thrust, are substantially in one horizontal line. This arrangement enables the greatest amount of muscular force to be utilized in the propulsion of the cycle, since it is known that one of the strongest muscular forces result from the toggle action of the legs from the hip down, when aided by the back muscles, since many strong muscles are used.

When the rider is seated on the seat 30, his back rests against the back 31, and his feet against the pedals 32, the seat 30 being adjusted in the proper position for convenience and for the necessary power, and then the forces produced against the back and against the pedals are on substantially a horizontal line. The reaction forces on the back 31 translate themselves to the couple formed by the bars 27 and 25, acting in the nature of an elbow lever, and the lower end of the bar 25 being connected to the main frame by cross bar 23 causes the translated forces to raise the single frame bars 12 upwardly in the general direction of the arrow 35. The reaction forces on the pedals, that is on that pedal which is in its upward position, translate themselves to the axle 15 of the sprocket 16, and to the couple consisting of the bars 20 and 21, which bar 21 has the forces exerting an upward lift to the single frame bars 12, in the general direction of the arrow 36. The end of the bar 21 at 24 has a tendency to move upwardly and the lower part of the bar 25 has a tendency in the same direction. The composite or resultant force then exerts an upward push to the single frame, and by this translation of forces, no downward force is exerted upon the axles 13 and 17 of the wheels, as a result of the forces produced by muscular action, and to some extent some part of the weight of the frame and seat, etc., and of the rider is neutralized. A certain resilient action of the frame of the bicycle, especially when encountering small obstacles is evidenced in the use of this improved frame.

The rear bar 26 has its lower end 26a resting on the axle 13 of the rear wheel 14, and its upper end connected with the seat bar 41. The bar is inclined, and being joined to the bar 25, the weight is divided over these bars 26 and 25, so that the weight on the rear axle is thereby reduced.

The various parts have been referred to as bars but they are tubing, and certain of such bars are on each side of the wheel. Certain of the tubes may be filled with reinforcing material.

The seat 30 itself is constructed with a clamping device 40, which in turn is clamped to the seat bar 41. The two bars 27 forming the back bars are made a part of the clamp. The bars 27 have a hinge connection 42 with an extension 43 supporting the back 31. The back 31 may be moved over the seat 30, as shown in Fig. 6, by the hinge action for compactness sake.

The two bars 27 extend forward and are welded to the clamp 40, one bar on each side of the clamp. The clamp 40 itself is made a part of the frame of the seat. The clamp 40 embraces the bar 41 which is secured to the bars 26 and 25 by the sleeve 28. The bars 27 have straps 27a which are secured to the seat. The clamp 40 is opened or closed by a screw bolt 40a and this permits the fastening of the clamp on the bar 41 at any point along the same, adjustable to the leg reach of any rider. The bar 41 is made long to enable the seat to be brought forward for use for small leg reaches. The seat is upholstered, and oversize, and made rather flat, for male or female use.

Figure 3:
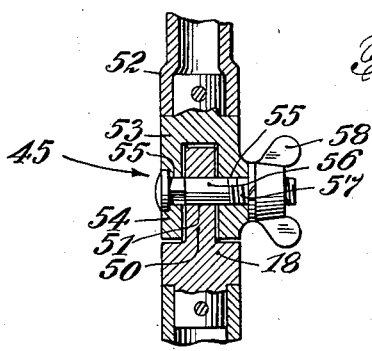
Fig. 3 is a vertical detail section taken on line 3—3 of Fig. 1.

The front post 18 has a universal connection 45 composed of the following parts:

Referring to Fig. 3, the vertical post is provided with a serrated projection 50 having a hole 51. The post 52 of the handle is provided with a forked end 52 to enable the projection 50 to be inserted therein. These forks 54 each have a hole 55, and the inner surfaces are serrated. A headed bolt 56, having a screw threaded end 57 engaged by a thumbnut 58, passes through the holes 51 and 55, when in registration, and the tightening action of the thumbnut 58 clamps the serrated surfaces together. This permits an adjustment of the position of the handle, to the arm reach of the rider as he sits in upright position.

Suitable guards 60 and 61 for the wheels are provided, and a chain guard 62 covers the front part of the chain and the sprocket. Straps 63 support the guard 60 from the rear axle 13, and straps 64 support the guard 61 from the front axle. The chain guard is supported by straps 65 secured to the main frame. The chain passes over the sprocket and over a sprocket on the rear wheel axle.

An attachment to facilitate the learning of balancing may be detachably applied to the frame. This consists of a U shaped frame 70 having a wheel 71 at each end. The frame 70 is connected with a bracket 72, secured by a bolt 73 to the main frame. The bolt 73 with its nut 74 may be readily removed permitting removal of the wheeled frame 70. The frame 70 may be kicked back for non use, and then straddles the rear wheel, a kick back spring 70a holding it in either position.

The bending down of the back 31 upon the seat 30 and the bending down of the handles 50, enables the bicycle to be brought to a minimum space contents, convenient for shipment or carrying.

The invention provides a compact bicycle so constructed as to enable a child six years old or a person six feet tall, male or female, to ride the same bicycle by a slight adjustment of the seat, and handle bar, and to ride it more safely, more comfortably, with more power and speed, with less effort, energy, and fatigue, and better equilibrium. It is so compact as to enable it to be stored in an ordinary clothes closet or in rear compartment of an automobile, and to be almost half the size and weight of the ordinary so-called safety bicycle used today.

The single bar frame which converges parallel from the pedal mechanism acts like a spring fork absorbing and minimizing shocks while riding over rough roads.

The entire seat assembly including the back rest is more horizontally disposed as a whole unit than bicycles heretofore proposed.

The rear wheel is of a small diameter permitting the child of about six years of age to place both feet flat on the ground when the bicycle is not in motion. This is possible by having the entire seat assembly close to and above the small sized rear wheel which enables the rider regardless of size to place both feet flat on the ground when the bicycle is not in motion.

Lower center of gravity of the frame design enables the rider to balance more easily and safely.

There is less fatigue with more speed and power with less effort derived by using the back rest as a brace for the forward push onto the pedals sitting and pedaling in a horizontal position, when combined with the novel single frame construction cooperating with the force couples described.

I have described several forms of my invention, but obviously various changes may be made in the details disclosed without departing from the spirit of the invention as set out in the following claims:

I claim:

1. In a bicycle, having a seat at an elevation enabling the smallest leg reach to touch the ground, and pedals when in pressure position being substantially in a horizontal line with said seat, a one piece frame including a pair of longitudinally disposed tube members substantially parallel with said horizontal line, connected at their front ends and adapted to support at such connected ends a pedal mechanism having a sprocket and shaft, said members straddling the front post of the bicycle, and the axle of the rear wheel, a supporting bar connected with the front post and extending upwardly and forwardly and connected with the connected front ends of said frame, a second bar connected with the front post and extending upwardly and rearwardly through the spaced tube members, a substantially horizontal seat bar, a third bar extending upwardly from the rear axle to the seat bar, and a fourth bar connected with the upper end of the third bar and extending downwardly and forwardly therefrom to and connected with the tube members, whereby the reach of the legs exert a toggle action upon the pedals, and the forces exerted by the rider between the seat and pedals tend to vertically raise the frame at its central portion.

2. In a bicycle, having a seat at an elevation enabling the smallest leg reach to touch the ground, and pedals when in pressure position being substantially in a horizontal line with said seat, a one piece frame including a pair of longitudinally disposed tube members substantially parallel with said horizontal line, connected at their front ends and adapted to support at such connected ends a pedal mechanism having a sprocket and shaft, said members straddling the front post of the bicycle, and the axle of the rear wheel, a supporting bar connected with the front post and extending upwardly and forwardly and connected with the connected front ends of said frame, a second bar connected with the front post and extending upwardly and rearwardly through the spaced tube members, a substantially horizontal seat bar, a third bar extending upwardly from the rear axle to the seat bar, and a fourth bar connected with the upper end of the third bar and extending downwardly and forwardly therefrom to and connected with the tube members, the front of the perimeter of sprocket and the front of the perimeter of the front wheel being substantially on a vertical line, the furthest reach of the pedals having a clearance with any position of the front wheel.

3. In a bicycle, having a seat with a substantially vertical back at an elevation enabling the leg reach of the rider to touch the ground, and pedals when in pressure position being substantially in a horizontal line with said seat, the combination of a one piece frame including a pair of longitudinally disposed tube members connected at their front ends and adapted to support at such connected ends a mechanism for said pedals having a shaft, a sprocket and pedals, said members straddling the front post of the bicycle, and the sprocket axle of the rear wheel, a first supporting bar connected with the front post at the front thereof, and extending upwardly and forwardly and connected with the connected front ends of said tube members in front of the front post, a second bar connected with the rear of the front post below the tube members at the rear of the first bar connection with the front post, and extending upwardly and rearwardly through the spaced tube members, a third bar extending upwardly and forwardly from the rear axle, a fourth bar connected with the upper end of the third bar and extending downwardly and forwardly therefrom and connected with the end of the second bar and extending to and connected with the tube members, and a horizontal seat bar for said seat connected at one end with the upper ends of the third and fourth members, and having the other end extend forwardly of said connection and of a length adapted to enable the seat to be moved forwardly of the connection and towards the pedals.

JACK FRIED.

REFERENCES CITED

The following references are of record in the file of this patent:

UNITED STATES PATENTS

| Number | Name | Date |
| --- | --- | --- |
| 364,075 | Williamson | May 31, 1887 |
| 493,201 | Xander | Mar. 7, 1893 |
| 617,136 | Wilkins et al. | Jan. 3, 1899 |
| 690,733 | Jarvis | Jan. 7, 1902 |
| 1,610,016 | Kuchta | Dec. 7, 1926 |

FOREIGN PATENTS

| Number | Country | Date |
| --- | --- | --- |
| 453,687 | Great Britain | Sept. 16, 1936 |
| 496,086 | Great Britain | Nov. 24, 1938 |
| 806,333 | France | Sept. 21, 1936 |